United States Patent [19]

Natter

[11] 3,784,738

[45] Jan. 8, 1974

[54] IMAGE REPRODUCTION SYSTEM FOR DIMENSIONAL STEREOPTIC PERCEPTION

[76] Inventor: Howard Natter, 185 Grandview Blvd., Yonkers, N.Y. 10710

[22] Filed: Dec. 21, 1971

[21] Appl. No.: 210,348

[52] U.S. Cl. .................................. 178/6.5, 350/139

[51] Int. Cl. .......................... H04n 9/56, H04n 9/58

[58] Field of Search ............... 178/6.5, 7.85, DIG. 1; 350/130, 131, 133, 137, 143, 139; 179/156 R, 157

[56] References Cited

UNITED STATES PATENTS

| | | | |
|---|---|---|---|
| 3,670,097 | 6/1972 | Jones | 178/6.5 |
| 2,955,156 | 10/1960 | Heilig | 178/6.5 |
| 3,205,303 | 9/1965 | Bradley | 178/DIG. 1 |
| 3,529,082 | 9/1970 | Hoesli | 178/6.5 |
| 2,949,055 | 8/1960 | Blackstone | 178/6.5 |
| 2,621,247 | 12/1952 | Wright | 178/6.5 |

FOREIGN PATENTS OR APPLICATIONS

| | | | |
|---|---|---|---|
| 888,317 | 1/1962 | Great Britain | 178/6.5 |

OTHER PUBLICATIONS

Maxwell – Cameras That Wink Can Produce 3–D TV – Electronics – March 18, 1968, – pp. 132, 133.

Stereotronics Corp. Publication – 1961.

*Primary Examiner*—Robert L. Griffin
*Assistant Examiner*—Joseph A. Orsino, Jr.
*Attorney*—Seth Natter

[57] ABSTRACT

Dual images of the same scene are registered through two viewing stations, the geometric centers of which are spaced apart the average interpupillary distance. An image tube camera receives the images and produces corresponding video signals. In one embodiment, the images are optically juxtaposed to side by side relationship and focused on a photoconductor surface of a single image tube to produce video signals. Receiving stations convert the video signals into two visual side by side images on a CRT. The receiving stations include headgear having spaced apart observation windows, magnifying lenses and means which preclude peripheral visual distraction. An accompanying stereophone acoustical system includes equipment in the headgear to stereophonically reproduce audible sounds in simulation of the sounds associated with the scene. Optionally, the image registered through each viewing station may be focused on the photoconductor surface of an individual image tube to provide separately generated video signals for each viewing station. In this embodiment, the receiving stations include a CRT for each of the generated signals.

5 Claims, 15 Drawing Figures

INVENTOR
HOWARD NATTER
BY
Seth Natter
ATTORNEY

INVENTOR.
HOWARD NATTER
BY
Seth Natter
ATTORNEY

INVENTOR.
HOWARD NATTER
BY
ATTORNEY

INVENTOR
HOWARD NATTER
BY
Seth Natter
ATTORNEY

PATENTED JAN 8 1974 3,784,738

INVENTOR.
HOWARD NATTER
BY
Seth Natter
ATTORNEY

INVENTOR.

HOWARD NATTER

BY

ATTORNEY

IMAGE REPRODUCTION SYSTEM FOR DIMENSIONAL STEREOPTIC PERCEPTION

BACKGROUND OF THE INVENTION

1. Field of the Invention

Stereoscopy utilizing electronically transduced dual images.

2. Brief Description of the Prior Art

The technology of stereoscopy relies on the phenomenon of depth perception through binocular vision. The brain renders a sensation of depth by rapid comparison and combination of the complete and somewhat different views of the same scene observed through each eye. The views received through each eye differ significantly because the angle of vision of each eye is different. Thus, objects of a scene appear slightly different to each eye in that the angles and distances of objects appear in slightly altered relations to each other. Additionally, the light distribution on objects in a scene are differently observed in each eye, i.e., highlights, shadows, etc., appear in different positions and with varying degrees of intensity.

Stereoscopic devices heretofore presented two dissimilar pictures for observation of one picture at each eye. It is essential that each of the eyes perceives only one of the pictures. Usually stereoscopic pictures for use in prior stereoscopic devices were provided by utilizing a stereoptic camera which included two separate spaced apart lenses, each of which focused a slightly different view of the same scene on a photographic film. The films were subsequently developed to produce either prints or transparencies for use in a stereoscopic viewing system.

A common viewing system utilized geometric image separation for the viewing of prints or transparencies. Unfortunately, present technology has been unable to accurately utilize such geometric systems to stereoscopically recreate moving images at a feasible cost.

An additional disadvantage with prior stereopsis systems was that they were unable to provide instantaneous (live) viewing of actual scenes or instant replay of actual scenes. This was primarily because initially the dual images were photographed on an actinic surface, then image modulated transparencies or negatives were developed and either the transparencies or prints were mounted. If a geometric viewer was utilized, extreme care had to be exercised in orientating and aligning each of the transparencies or prints which formed a matching image set so that the selected image was viewed only by the properly associated eye. Misalignment resulted in a loss of dimensional simulation and viewer discomfort resulting from eyestrain.

A slightly different approach to stereoscopic viewing utilized superimposed anaglyphs which required a matching colored viewing device for each eye. Further approaches included the use of polarizing filters on either an actinic recording film (vectographic process) or an image reproduction projection system, either of which generally required accompanying polarized lenses positioned in front of the viewer's eyes.

Substantially, all of these approaches to stereoscopic viewing carried the inherent disadvantage of the inability to provide instantaneous viewing of actual scenes because the photographic film medium which recorded the images required subsequent development.

Most stereoptic film systems utilized heretofore were cumbersome in many present pedagogical situations because they were unable to utilize beneficial live closed circuit television systems in widespread use throughout educational facilities.

Where laboratory demonstrations, lectures, etc., were desired to be distributed to a large number of students utilizing closed circuit television systems, dimensional image reproduction was not possible. This was of exceptional disadvantage in the field of medical education wherein actual live patient treatment procedures could be distributed in closed circuit television systems, although lacking in discernable three dimensional characteristics.

Further drawbacks associated with some of the prior viewing systems was that because of the equipment utilized for viewing, e.g., colored lenses or polarized filters, worn by the viewer, accompanying eye strain inhibited full dimensional simulation. With regard to the geometric separation system of viewing spaced apart prints or transparencies, some devices included the drawback of peripheral distractions and, as previously mentioned, most were not capable of utilization for viewing moving images. Additionally, geometric viewing devices were incapable of presenting an effective total environment sensation because the geometric viewing devices presented only a simulated still illustration of depth perception without additional sensory perception accompaniment such as stereophonic reproduction.

SUMMARY OF THE INVENTION

In summary, the invention includes means for transduction of dual images of the same scene into video signals by one or more image tube cameras, e.g., an image orthicon, vidicon, etc. An image displacer with an image field conversion adjusting mechanism is utilized if the video signals are generated from a single image tube camera. Optionally two image tube cameras may be utilized with an image field conversion adjusting mechanism so that fields of vision of both cameras will converge at the same scene. The video signals may be magnetically recorded, instantaneously distributed through a closed circuit network or transmitted to remote stations. Simultaneously with image conversion, stereophonic acoustical transducers convert accompanying sounds into audio signals.

Receiving stations are adapted to convert the video signals into visual images on a CRT. If two image tube cameras are utilized for separate video signal generation, each image will appear on a separate CRT. The CRT is positioned within lightweight headgear having spaced apart observation windows and stereophonic sound reproduction means, while the remainder of the electronic receiving equipment is positioned in a base unit remote from the headgear.

From the above summary, it will be appreciated that one of the objects of the present invention is to provide a reproduction system for dimensional sensory perception of the general character described which is not subject to the foregoing disadvantages.

More specifically, it is an object of the present invention to provide a reproduction system for visual dimensional sensory perception of the general character described which may be operated with great facility and which includes lightweight portable remote receiving stations for stereoptic viewing and which is well suited for individual or group applications.

Another object of the present invention is to provide an image reproduction system for dimensional sensory perception of the general character described which includes means to receive dual images of the same scene and convert the images into video signals for distribution to and reconversion at receiving stations.

A still further object of the present invention is to provide an image reproduction system for dimensional sensory perception of the general character described which converts moving dual images of the same scene into video signals to be either distributed to receiving stations in a closed circuit network, transmitted to remote receiving stations or recorded for subsequent replay and distribution at desired receiving stations.

Yet another object of the present invention is to provide a reproduction system for dimensional sensory perception of the general character described which includes receiving stations having headgear for the stereopsis viewing of a moving scene with simultaneous coordinated stereophonic reproduction of sounds conjunctive with the scene.

A still further object of the present invention is to provide a reproduction system for dimensional sensory perception including stereopsis receiving stations adapted for entertainment or tutorial purposes and including means to convert video signals into dual images for personal viewing.

A further object of the present invention is to provide an image reproduction system for dimensional sensory perception which includes means utilizing existing television transmission equipment to transmit dual images of a scene to remote receiving stations.

Another object of the present invention is to provide a novel reproduction system for visual depth perception of objects in a scene utilizing electronically transduced video signals as a dual image carrier between the actual scene and reproduced images positioned before a viewer.

A further object of the present invention is to provide a stereoptic reproduction system for visual depth perception of objects in a scene including the registration of two images of the same scene through spaced viewing stations, the conversion of the images into video signals and reconversion of the video signals into stereoptic images.

An additional object of the present invention is to provide a reproduction system for dimensional sensory perception, including the conversion of two spaced apart images of the same scene into video signals, the simultaneous conversion of sounds accompanying the scene into stereophonic audio signals and the reconversion of the signals into stereoptic images and stereophonic sounds.

Other objects of the invention in part will be obvious and in part will be pointed out hereinafter.

With these ends in view, the invention has embodiment in certain series of steps, as well as in certain features of construction, combinations of elements and arrangements of parts by which the said objects and certain other objects are hereinafter attained, all as fully described with reference to the accompanying drawings, and the scope of which is more particularly pointed out in the appended claims.

BRIEF DESCRIPTION OF THE DRAWINGS

In the accompanying drawings in which are shown some of the various possible embodiments of the invention.

DESCRIPTION OF THE PREFERRED EMBODIMENTS

Figures 1, 2:
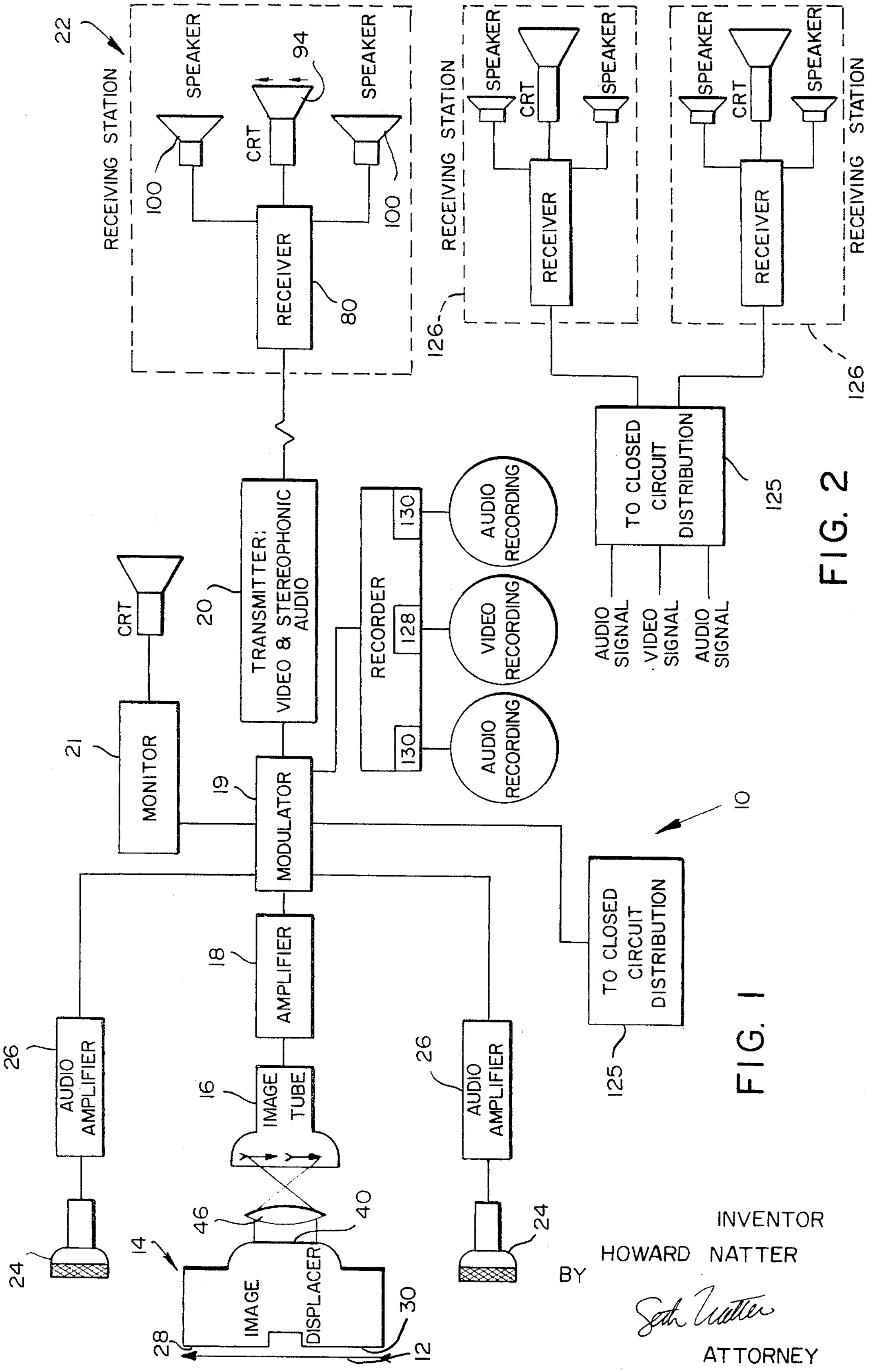
FIG. 1 is a schematized block diagram of an image reproduction system embodying the invention and showing the system adapted for the transmission of stereoptic video and stereophonic audio signals to remote receiving stations; additionally shown is means for the simultaneous recording of such signals and instantaneous closed circuit distribution thereof.
FIG. 2 is a schematized block diagram of an exemplary system for the closed circuit distribution of the video and audio signals and showing, in an illustrative manner, two receiving stations.

Referring now in detail to the drawings, the reference numeral 10 denotes generally an image reproduction system for stereoptic dimensional perception constructed in accordance with and embodying the invention. The system 10 includes means for the transduction of two separate images of the same scene into video signals which are transmitted to a receiving station simultaneously with stereophonic audio signals. At the receiving station the video signals are converted to produce two side by side images on a screen of a rectangular faced cathode ray tube.

Attention is directed to FIG. 1 wherein it will be observed that the system reproduces the image of a scene incorporating objects, such as an object 12, and includes an image displacer 14 having two viewing stations, through each of which an image of the object 12 is registered. In a manner to be subsequently described, the image displacer 14 is so constructed and designed that the associated images of each viewing station are placed in side by side edge abutting relationship at a single camera station. With the image displacer 14 secured to an image camera, the two images are focused through an objective lens of an image tube 16. The image tube 16 forms an integral part of an image tube camera and generates video signals corresponding to the dual side by side images registered through the objective lens. The video signals are fed to an amplifier 18 and thence to a modulator 19 and a transmitter 20 for carrier wave transmission to a remote receiving station 22 (outlined in dashed lines). It should be noted that sounds accompanying the scene are stereophonically transduced at spaced apart microphones 24 so that dual audio signals are generated, which audio signals are transmitted to appropriate amplifiers 26 and thence to the modulator 19 and transmitter 20 for simultaneous video and stereophonic audio signal transmission. An appropriate video monitor 21 is provided in accordance with conventional transmission procedures.

It will be appreciated that the terms "modulator" and "transmitter" refer generally to transmission station equipment which modulates and transmits conventional f.m. video signal modulated carrier waves as well as stereophonic f.m. audio signal modulated carrier waves in a well-known manner. While stereophonic audio transmission and reception has been utilized heretofore to produce audible depth perception effects with simulated sounds, the utilization of carrier waves for the reception and transmission of stereoptic video signals is an innovative feature of this invention.

Figures 3, 5:
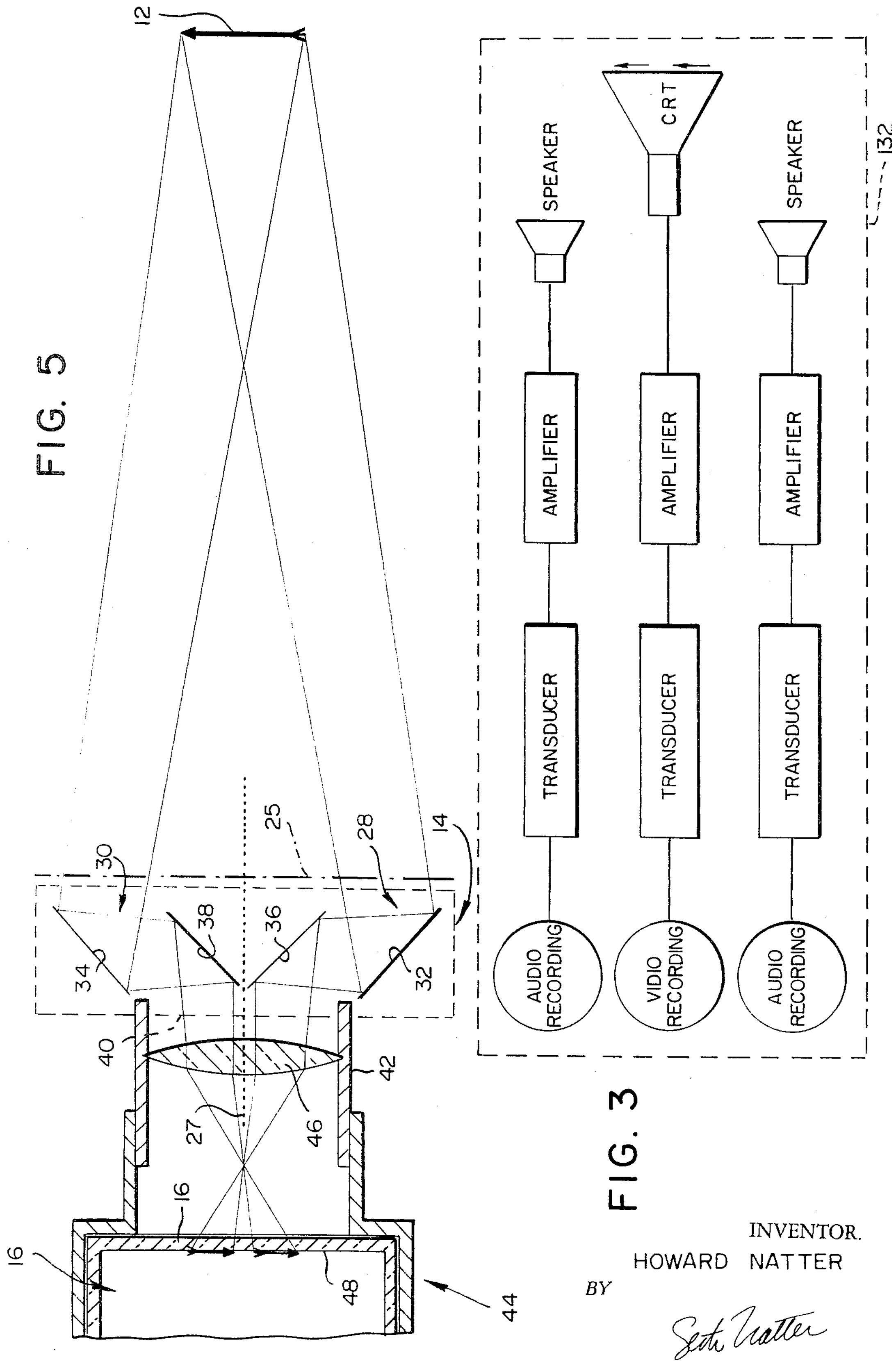
FIG. 3 is a schematized block diagram of a recorded signal transducing station for the reproduction of signals recorded in the system of FIG. 1.
FIG. 5 is a ray trace diagramatic illustration of the manner employed in one embodiment of the invention by which a single object of a scene produces dual image signals through the utilization of planar reflective surfaces of an image displacer positioned in registry with the objective lens of an image camera.

In FIG. 5 there is illustrated a ray trace diagram of the manner in which the image displacer 14 utilizes planar reflective surfaces to transpose two separate images of the same object registered through spaced apart viewing stations or windows into side by side relationship for registration through a single camera station and focusing at an image tube camera. The image displacer 14 (outlined in dashed lines in FIG. 5) includes a right viewing station or window 28 and a left viewing station 30 or window. The optical centers of the vertical centerlines of the viewing stations are spaced apart the average interpupillary distance, i.e., approximately 2 5/8 inches. At an angle approximately 45° from a plane 25 (indicated by a dot and dash line) which is normal to the camera objective lens axis 27 (indicated by a dotted line) is a pair of first planar image reflective surfaces 32, 34 respectively. The first reflective surfaces face their respective viewing stations or windows. Spaced from and facing each of the first reflective surfaces and in approximately parallel relationship thereto is a second planar image reflective surface 36,38 respectively. The pair of second planar reflective surfaces, as well as the pair of first planar reflective surfaces each lie in planes intersecting at the axis 27. The reflective surfaces 32, 34 36, 38 of the image displacer 14 may be conventional planar mirrors or flats of prisms.

It should be additionally noted that the second planar reflective surfaces are disposed in the line of sight of and facing a camera station 40 centrally positioned at the rear of the image displacer 14. The orientation of the reflective surfaces is such that the image rays of the object 12 are reflected from both the first and the second reflective surfaces and two images of the object are perceived through the viewing stations will be visible at the single camera station 40 in side by side relationship after each image has been twice reflected, once from the first and once from the second reflective surface, thereby returning to its original orientation.

The image displacer 14 includes a casing adapted to be adjustably secured to a lens barrel 42 of an image tube camera 44. The image tube 16 may be of conventional construction, e.g., image orthicon, image vidicon, etc. It will be appreciated that the image tube camera 44 includes a common objective lens 46 and a single image tube 16. The position of the objective lens 46 is preferably adjustable to focus an image upon an image receiving photoelectric surface 48 of the tube 16.

From an observation of the ray trace diagram (FIG.5) it will be seen that when the image displacer 14 is secured to the lens barrel 42, and the reflective surfaces of the image displacer 14 are orientated so that each of the viewing stations registers an image of the object 12, two side by side images of the object 12 appear in front of the lens 46 and are focused upon the photoelectric surface 48.

In accordance with conventional television technology, the image tube 16 will generate video signals. However, such video signals will correspond with the two side by side images focused on the photoelectric surface 48 without alteration of the internal structure or operation of the standard image tube camera 44.

Figures 6, 7, 13:
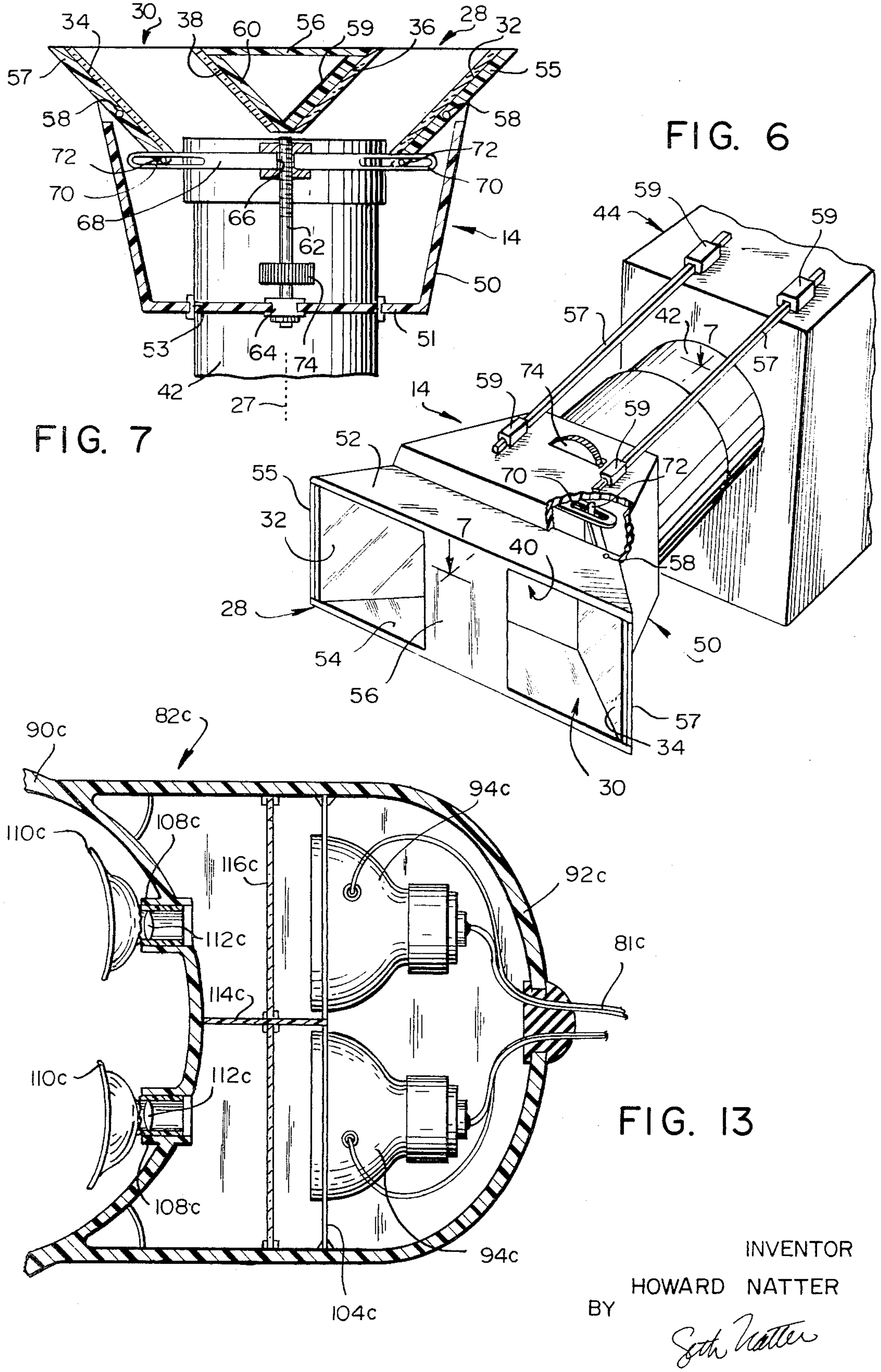
FIG. 6 is a fragmentary perspective illustration of the image displacer with a portion broken away for clarity and positioned in registry with the objective lens of an image camera.
FIG. 7 is a fragmentary longitudinal sectional view through the image displacer the same being taken substantially along the line 7—7 of FIG. 6 and illustrating a field of vision adjustment mechanism utilized to change the angular orientation of two of the reflective surfaces of the image displacer to thereby adjust the reflected image field so that each includes the same scene.
FIG. 13 is a sectional view, similar to that of FIG. 9, through an alternate embodiment of the headgear unit designed for utilization in conjunction with the video signal generating system illustrated in FIGS. 11 and 12 and as shown in FIG. 4.

In FIGS. 6 and 7, structural details of a particular image displacer which may be employed in conjunction with the present invention are illustrated. As shown in these illustrations, the image displacer 14 is adapted for direct camera mounting and has a lens barrel accommodating collar 50 with a substantially vertical rear wall 51 having a circular aperture 53 into which the cylindrical lens barrel 42 is journalled. The collar 50 is shown as trapezoidal in plan configuration, although such shape is not critical. The collar 50 extends to and merges with a forward portion of the image displacer. The forward portion of the image displacer includes parallel upper and lower walls 52, 54 respectively, the lower wall 54 of which is coextensive with the lower wall of the collar 50 and the upper wall of which is joined to the upper wall of the collar 50. The walls 52, 54 are maintained in spaced relationship by a substantially vertical broad central strut 56, the width of which separates the otherwise open area at the front of the image displacer into the two viewing stations or windows 28, 30.

To maintain vertical and horizontal alignment of the image displacer when the lens barrel is rotated for focusing, a pair of spaced parallel alignment rails 57 slidably bridge between opposed guides 59 on the image displacer 14 and the camera 44.

It will be appreciated that the first reflective surfaces 32, 34 are affixed to mounting plates 55, 57 respectively which are secured between the upper and lower walls 52, 54 such that the reflective surfaces 36, 38 are vertical and approximately at an angle of 45° to the central strut 56 and lie in planes perpendicular to the parallel walls 52, 54. Suitable pivots such as pintles 58 are provided for supporting the mounting plates between the walls 52, 54. Each pintle 58 extends vertically through a mounting plate and in a plane passing through the center thereof. The terminal ends of each pintle are journalled in sockets formed on opposed faces of each wall 52, 54. By pivotally mounting the first reflective surfaces 32, 34 an adjustment is provided whereby the object 12 may be positioned at a relatively close distance from the beam splitter.

For any position of the object 12, the reflective surfaces 32, 34 must have their angular orientation such that the field of vision of each viewing station as perceived through the camera station converges at the same scene. This is possible only when, as schematically illustrated in FIG. 5, the ray trace lines from the entire object 12 are reflected through both sets of first and second reflective surfaces. With the second reflective surfaces 36, 38 fixed in their position, pivotal movement of the first reflective surfaces about their pintles 58 will provide the necessary adjustment of the image field perceived through the camera station so that two images of the object are presented.

Each of the second reflective surfaces 36, 38 is fixedly mounted to one of two vertical support walls 59, 60 lying in perpendicularly intersecting planes.

The optical axis 27 of the objective lens 46 extends co-axially through the center of the image displacer and the lines of intersection of the corresponding pairs of planes of both the first and second reflective surfaces.

In order to provide a mechanized adjustment for the angular orientation of the first reflective surfaces while their plates 55, 57 pivot about the pintles 58, a control shaft 62, threaded adjacent one end, is journalled at its other end for rotation within the rear wall 51 of the collar 50. For this purpose, a bearing 64 is provided in an opening in the rear wall 51, which opening is spaced above the lens barrel aperture 53. The threaded end of the shaft 62 engages a matingly tapped horizontal passageway 66 centrally provided in a slotted adjusting yoke 68.

The yoke 68 is formed of a substantially straight elongate bar having symetrically positioned camming slots 70 adjacent each of its ends. The yoke 68 is positioned substantially perpendicular to the lens axis 27 and between the strut 56 and the end wall 53 of the image displacer.

It should be noted that adjacent the end of each of the first reflective surfaces 32, 34 which extend toward the collar 50, a follower rod 72 projects upwardly into one of the camming slots 70. Rotation of the threaded shaft 62 will cause the yoke 68 to move translationally either toward or away from the central strut 56 because of the threaded engagement between the shaft and the tapped passageway 66. It should be noted that rotation of the yoke 68 is prevented by the confines of the collar 50. Such yoke motion will result in the simultaneous pivotal movement of both of the first reflective surfaces about the pintles 58 resulting from camming engagement between the follower rods 72 and the camming slots 70. Each of the first reflective surfaces will be rotated through substantially the same arc as the other first reflective surface. In order to facilitate operation of the adjusting mechanism, a ribbed thumb wheel 74 is fixedly secured to the shaft 62 and projects through an opening in the upper wall surface of the collar 50 for manual rotation.

It will now be readily seen that the image displacer may be adjusted so that the field of vision of each of the viewing stations as perceived through the camera station 40 may be extended to the same object or group of objects in a single scene whether the objects are relatively close to the image camera or distantly spaced therefrom. Furthermore, the image displacer provides two side by side images of a single object on a single photoelectric surface 48 of an image tube 16 with each image differing significantly because the angle of vision by which each of the viewing stations observes the object is different.

Thus, the object appears slightly different in each of the images focused on the photoelectric surface 48, and such differences in object appearance precisely represent the differences which would be registered through the eyes of an actual observer of the scene. As has been previously mentioned, the image tube generates video signals which are amplified and then transmitted via a conventional television transmission system utilizing modulated carrier waves to any of a number of remote receiving stations 22.

Figures 8, 14, 15:
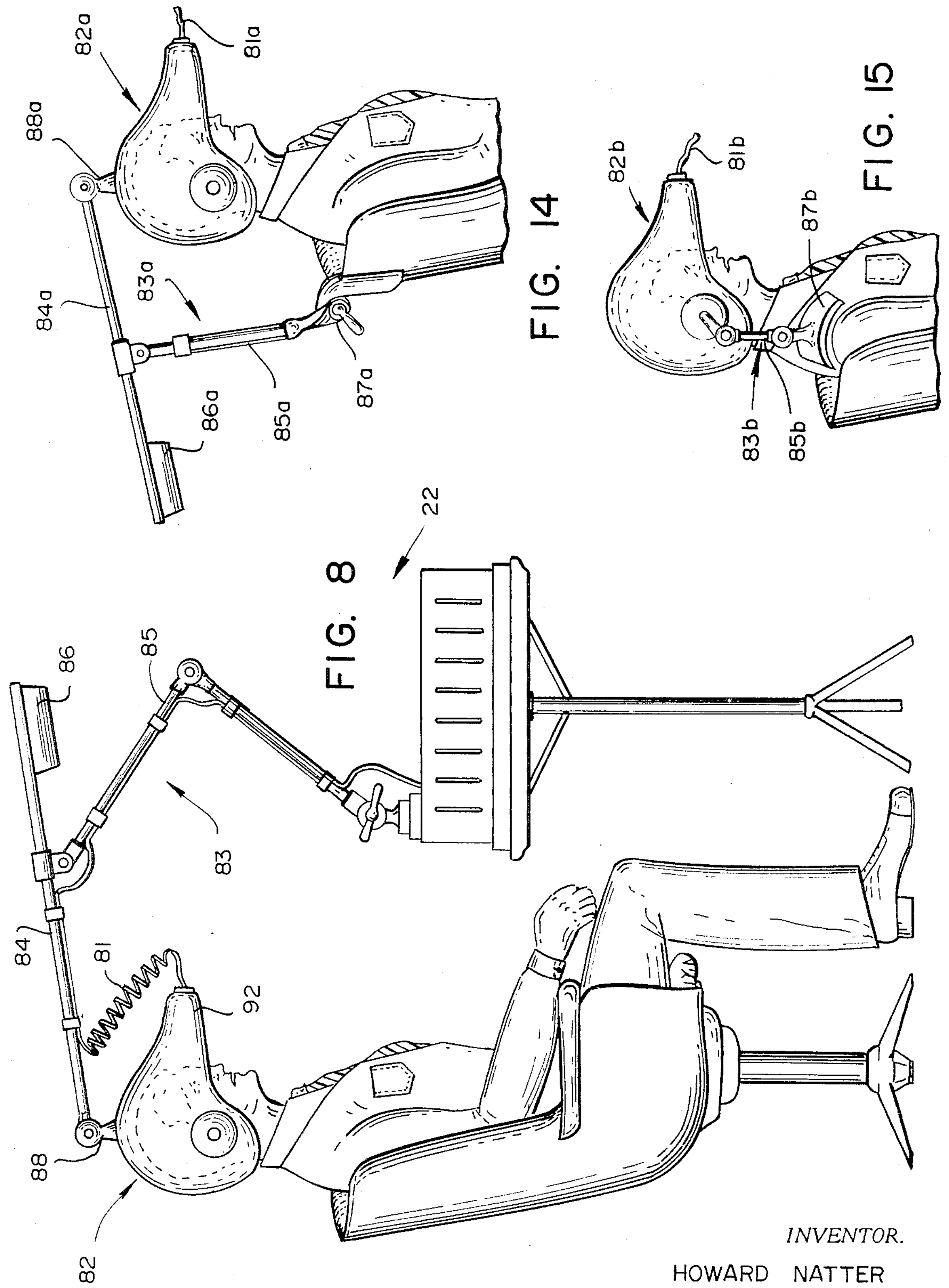
FIG. 8 is an elevational illustration of a receiving station constructed in accordance with and embodying the invention and illustrating a headgear unit positioned on a viewer's head.
FIGS. 14 and 15 are fragmentary elevational views of alternate embodiments of a headgear unit supporting mechanism wherein, in one embodiment (FIG. 14), the mechanism is secured to the back of a chair and in another embodiment (FIG. 15) a shoulder support is utilized.

In FIG. 8 a remote receiving station 22, suitable for application in this invention is illustrated. The receiving station 22 includes a base receiver unit 80 comprising the conventional receiver circuitry employed in television receivers, e.g., detectors, amplifiers, etc. The base unit 80 additionally includes the standard electronic circuitry employed for receiving stereophonic audio signals which are transmitted via carrier waves simultaneously with the video signal carrier wave transmission. The base unit 80 may include conventional power and receiving antenna or closed circuit cable leads (not shown). It will be appreciated that, in order to provide maximum comfort for the user and additionally to preclude peripheral visual and audible distractions, the cathode ray tube, i.e., picture tube, and speakers need not be fixedly secured to the receiver base unit, but are positioned within a lightweight headgear unit 82 which is donned by the user and coupled to the receiver unit 80 via a suitable multiple conductor cable 81.

From an observation of FIG. 8 it will be seen that the headgear unit 82 may be supported from the base unit 80 by a headgear supporting mechanism 83 having a boom 84 pivotally joined to an articulated elbow linkage 85. The boom 84 employs a counterweight 86 at one of its ends and suspends the headgear unit 82 at its opposite end with a swivel connector 88. Since the base unit 80 includes the bulk of the electronic circuitry necessary for reception, the headgear unit 82 only includes the cathode ray tube (CRT) and suitable audio speakers, and is thus relatively light in weight.

In FIG. 14, an alternate embodiment of the headgear supporting mechanism is shown wherein like numerals designate similar components previously described, however, bearing the suffix "*a*." A headgear supporting mechanism 83*a* of this embodiment includes a boom 84*a* having a counterweight 86*a* and pivotally joined to a telescoping upright 85*a* which extends from a clamp 87*a* affixed to the back of the user's chair. It will be observed that a headgear unit 82*a* is suspended from the end of the boom 84*a* with a swivel connector 88*a* in a manner identical to that of the previous embodiment.

A further embodiment is illustrated in FIG. 15 wherein a supporting mechanism 83*b* is shown. In this embodiment, a headgear unit 82*b* is directly supported from the user's shoulders by two swivel jointed uprights 85*b* which extend from weight distributing shoulder pads 87*b*.

Figure 9:
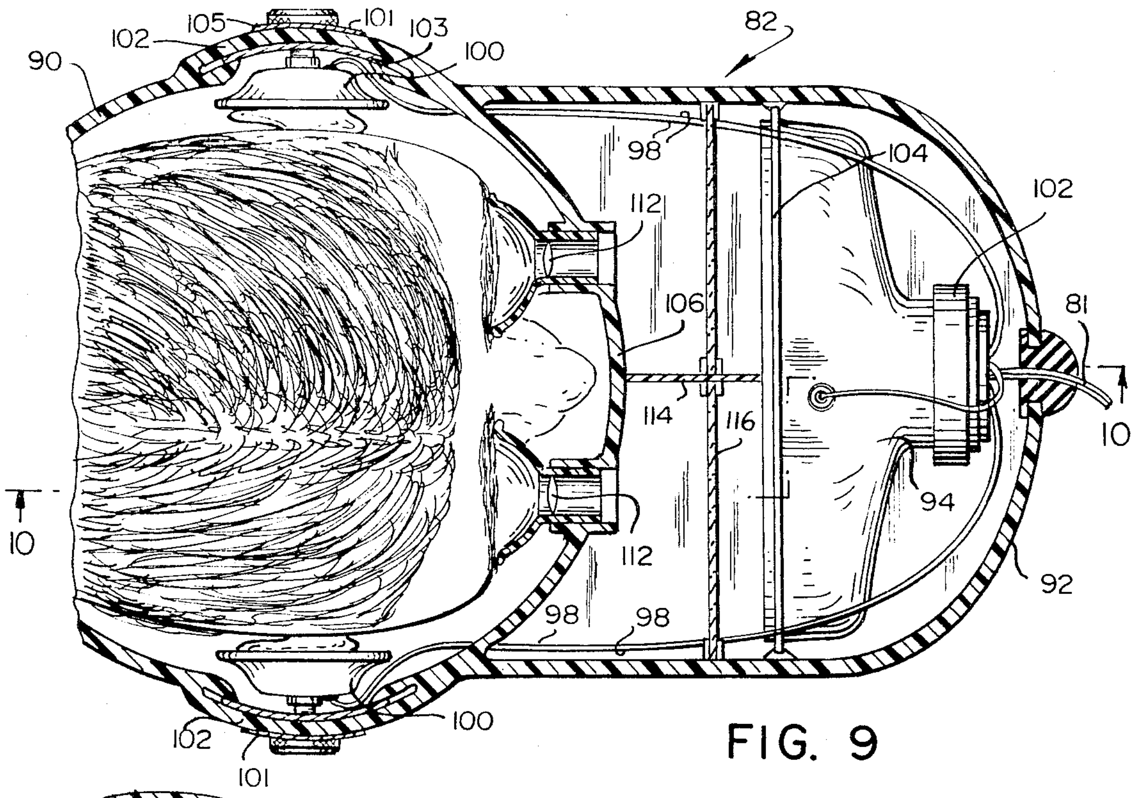
FIG. 9 is a fragmentary enlarged sectional view through the headgear unit, the same being taken substantially along the line 9—9 of FIG. 8.
Figure 10:
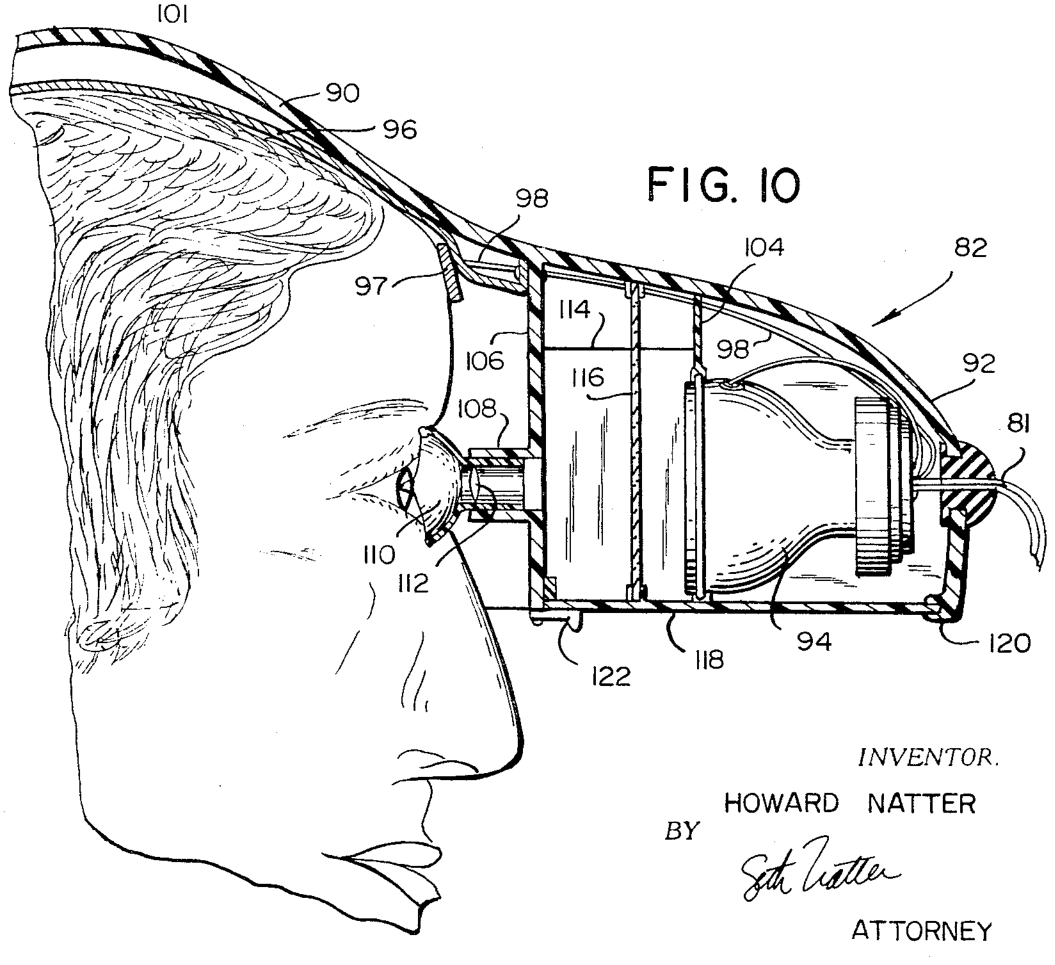
FIG. 10 is a further fragmentary enlarged sectional view through the headgear, the same being taken substantially along the line 10—10 of FIG. 9 and illustrating a CRT for reproducing dual images of the same scene; additionally shown are viewing windows including magnifying lenses to displace the images to an illusory distance of comfortable observation to prevent eye strain.

Referring now to FIGS. 9 and 10 wherein the interior structure of the headgear unit 82 is illustrated, it will be appreciated that the headgear unit 82 includes a cap like hemispherical shell 90 adapted to be donned by the user and circumscribe the upper portion of the user's head including both the eyes and ears. A hollow snout 92 projects forwardly from the shell 90 and conveniently houses a cathode ray tube 94. It will be appreciated that a plurality of straps 96 joined to an oval headband 97 may be positioned in the upper concave portion of the shell to facilitate air circulation within the shell and thus maximum user comfort. Alternatively, suitable padding (not shown) may be positioned in the upper concave portion of the shell. The headgear unit 82 comprising both the shell 90 and the snout 92 may be unitarily molded in one piece construction of a suitable lightweight plastic, e.g., acrylonitrile-butadiene-styrene, polyethylene, polypropylene, polystyrene, polyesters, etc.

It will be appreciated that the multiple conductor cable 81 extends into the snout through a forward aperture and selected leads 98 (see FIG. 10) carrying the stereophonic audio signals extend to appropriate speakers 100 which are mounted within hollow protuberances 102 of the shell 90. Each speaker is secured to one end of an adjustment shaft 101 which is threadingly mounted between two belleville type washers 103, 105. The shaft 101 turns relative to the washers to move the speaker 100 toward or away from the user's head. Furthermore, the washers are slidable about an enlarged opening in the protuberance 102 for additional adjustment. Each speaker is positiond adjacent one of the user's ears to stereophonically reproduce the audible sounds associated with the scene. The remainder of the conductors in the cable 81 are utilized to reproduce the dual images of the scene which have been focused on the photoelectric surface 48 of the image tube 16.

The cathode ray tube 94 (CRT) is housed solely within the snout 92 and the viewing screen of the tube is generally of a wide rectangular configuration. It will be appreciated that the width of the viewing screen should be approximately 5 inches so that the center of each of the dual images will be spaced apart from one another approximately the same distance as the centers of the viewing stations 28, 30. The cathode ray tube 94 is positioned in a forward portion of the snout 92 and conventional leads for producing an image on the screen remote from the receiver base unit 80 are employed. It should be noted that a substantially planar supporting frame 104 is utilized to mount the tube 94 in position.

A portion 106 of the shell 90 which partitions the viewer's face from the snout 92 extends downwardly as a skirt and includes a pair of viewing windows 108. The windows 108 may be of a tunnel configuration and may include, at the viewing end, a flexible eye cup 110 and adjacent the eye cup, a screen magnifying lens 112. The eye cup 110 may be mounted to a tubular sleeve slidingly received in the window for adjustment.

When the user dons the headgear unit 82, each of his eyes will be positioned in front of a viewing window and will individually observe a magnified image of only one of the dual images on the viewing screen of the tube 94. This is because the field of vision which is perceived through the viewing window is restricted so that the user's eye can observe only the image on the portion of the tube screen which is directly in front of the respective viewing window. Additionally, there may optionally be provided a partition wall 114 which separates the snout 92 along a vertical plane at the longitudinal axis. The wall 114 divides the viewable area between the shell portion 106 and the viewing screen of the tube 94 to assure separation of each image. In this aspect, it will be appreciated that the partition wall 114 is coincident with the division line between the two adjacent side by side images which are produced on the viewing surfaces of the tube 94.

As an added safety feature, a transparent leaded glass shield 116 may be provided between the viewing surface of the tube 94 and the magnifying lenses 112. The glass shield 116 is designed to absorb any possible emissions from the tube 94.

Optionally, an emission barrier may be provided by mounting the tube 94 in a vertical position with the viewing surface downwardly facing and above the windows while providing an image-only reflective surface at an angle to both the windows and the tube 94 (not shown). Image inversion by the reflective surface would be corrected by reversing the yoke connections to the tube 94 to provide 180° image phase inversion at the tube viewing surface.

In order to assemble the headgear unit 82 and service the components thereof, an access lid 118 is provided at the bottom of the snout 92 and the snout 92 may be appropriately grooved adjacent its forward lower edge 120 to receive an associated edge of the lid 118 while the lower lid of the shell portion 106 may include a suitable latch 122 to permit removal of the lid 118.

It should be pointed out at this time that a single base unit 80 may provide the core of a centralized remote viewing station and thus feed appropriate video and audio signals to a number of headgear units 82.

Returning now to FIG. 1 it will be observed that the present invention as illustrated therein including a closed circuit distribution system for both the video and audio signals. A closed circuit distribution system used in conjunction with the present invention would be typically of the type presently installed in educational institutions or in any other application wherein closed circuit television distribution would be desirable or is presently available. For the purpose of simplification, the closed circuit distribution system bears the reference number 125 and is shown as distributing the dual image modulated signal as well as a stereophonic audio modulated signal in FIG. 1. This designation does not refer to a specific circuit to be employed in such system, but to any closed circuit distribution system in general which is capable of the distribution of conventional audio and video signals to receiving stations conveniently connected thereto via cables.

The closed circuit distribution system 125 includes suitable cable for the connection to any one or all of a number of receiving stations indicated generally by the numeral 126 and outlined in dashed lines in FIG. 2. In actual practice, a receiving station 126 substantially incorporates the same components as does a remote receiving station 22. In fact, the same receiving station may be used for the closed circuit reception or carrier wave reception.

Returning again to FIG. 1 it will be observed that the image reproduction system 10 may optionally utilize video and audio recording devices 128, 130 respectively, which are coupled to record on the same magnetic tape. Because the video signals carrying the dual images are conventional video signals, any presently available commercial video recorder 128 may be employed for recording the video signals. A playback station 132 includes transducing and amplifying devices which may be utilized for the appropriate recorded signals. The transducing and amplifying devices may feed their output into a headgear unit such as the headgear unit 82 for stereoptic visual and audio perception.

In operation, with the stereoptic reproduction system 10 utilized to produce dual video images of a scene, the cathode ray tube 94 reproduces the dual images on its screen in an identical operating manner as a conventional picture tube of a television receiver, and thus utilizes an electron beam issuing from a gun which is modulated in intensity by the video signals so that the intensity of a phosphorescent spot produced by it on the tube screen is a reproduction of the intensity of the corresponding part of the scene. As is commonly known, the raster or pattern of scanning lines of the electron beam which provides coverage of the screen area is produced by a synchronizing and scanning circuit. The electron beam is carried across the screen in a sweeping action and the scanning circuit then banks it and returns it, moving it down and repeating the scanning pattern. The time and position of each sweep is identical to the corresponding operation in the image tube 16 with the scanning pattern linked by synchronizing pulses. The actual scanning operation skips alternate lines, and after completion of the scanning of one set of alternate lines, the beam is deflected back to the top of the picture and repeats this operation, filling in the unfilled lines of the previous operation. Since the intensity of each spot corresponds to the intensity of the original scene and the position of the spot corresponds to the position of the original scanning in the image tube 16, the dual images reproduced on the screen of the picture tube are identical to that which was focused on the photoelectric surface 48 of the image tube 16.

It should be noted that although the height of the picture tube screen may be relatively small, e.g., 2 inches, the image on the picture tube screen is magnified when viewed through the viewing windows 108 and it is possible that the actual raster lines of sweep may become observable due to the proximity between the user's eyes and the screen under magnification. It is possible to improve the quality and fidelity of the video images by utilizing a greater number of scan lines in the raster. A further embodiment of the invention utilizes a separate video signal and cathode ray tube for each of the dual images. Thus an improvement in image definition may be achieved by reducing the length of each scanning sweep and providing for the reproduction of but a single image in each scanning sweep.

Figures 4, 11, 12:
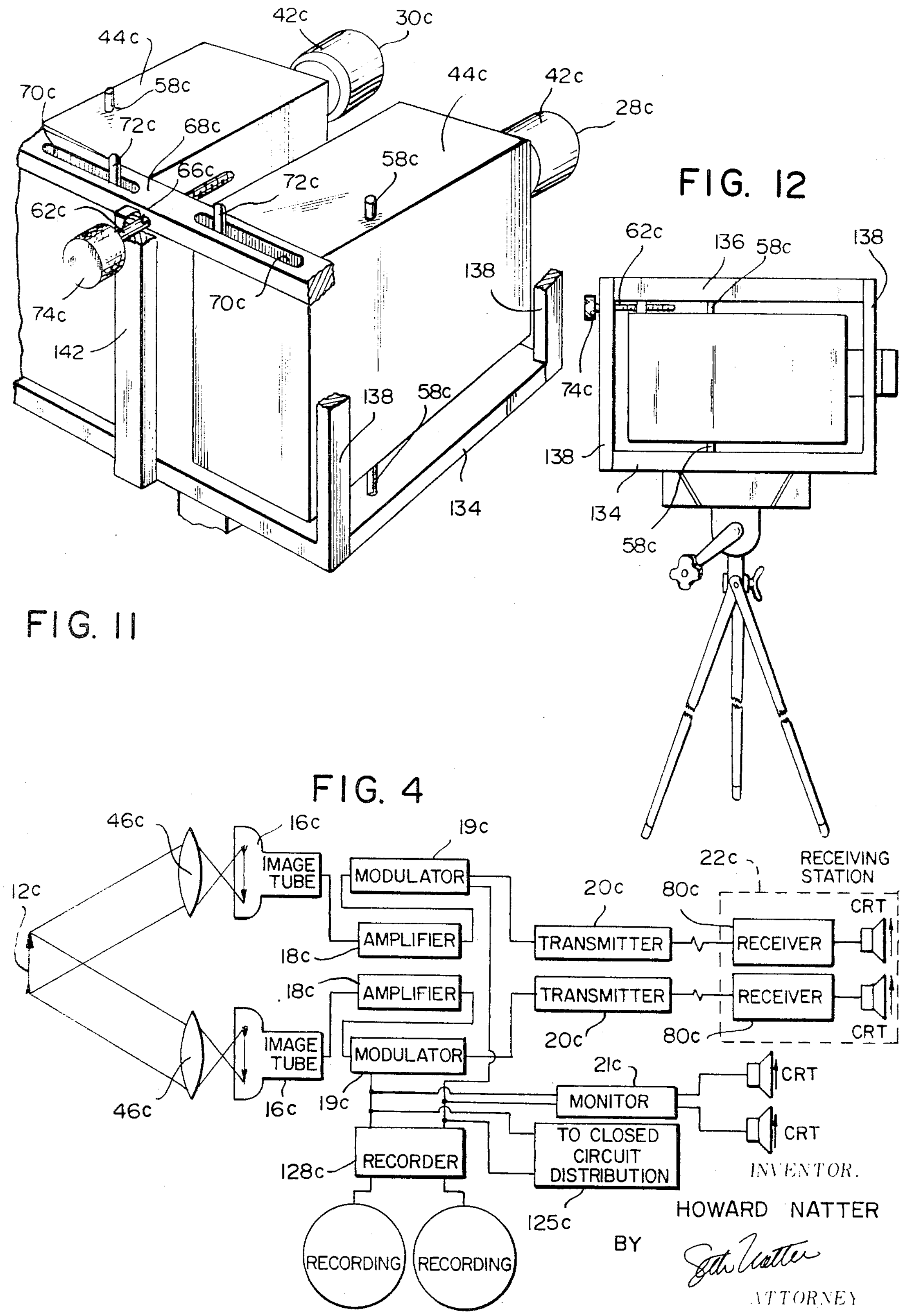
FIG. 4 is a schematized block diagram of a modified embodiment of the invention wherein video signals are separately generated from two image tube cameras for stereopsis.
FIG. 11 is a fragmentary perspective illustration of an alternate stereoptic video signal generating system wherein separate video signals are generated through the utilization of two separate image tube cameras and wherein a field of vision adjustment mechanism is provided to adjust the convergence of the field of vision of each of the cameras so that both cameras receive images of the same scene.
FIG. 12 is a reduced scale elevational view of the signal generating system shown in FIG. 11.

In FIG. 4 a schematized block diagram of a modified embodiment of the reproduction system utilizing separate video signals for each of the dual images is shown. It should be understood that in this block diagram the stereophonic transduction, transmission and reproduction of the accompanying audio signals has been omitted for simplification purposes only. Referring now to FIG. 4 wherein this alternate embodiment is shown with like numerals indicating corresponding components of the previously described embodiments, however bearing the suffix designation "*c*," the reference number **10*c* denotes the image reproduction system which is similar to the image reproduction system 10, however the image displacer is omitted and separate image tubes 16*c* are utilized to generate separate video signals of an object 12*c*. Each of the video signals is amplified at a separate amplifier 18*c*, modulated at a modulator 19*c* and are fed to a pair of separate transmitters 22*c* for individual carrier wave transmission. In a manner similar to that described in the previous embodiment, an appropriate video monitor 21*c*** is provided.

A single receiving station **22*c* includes sufficient electronic components for the detection of and demodulation of each of the video signals. For the purposes of simplification the illustration of the receiving station 22*c* in FIG. 4 is shown as utilizing two separate receiver base units 80*c*. Each of the base units 80*c* may be conveniently incorporated into a single receiver base unit cabinet similar in external configuration to the receiver base unit 80 of the previous embodiment and illustrated in FIG. 8. Of course, the utilization of a plurality of remote receiving stations 22*c*** is desirable.

The receiving station **22*c* includes, in addition to the receiving base units 80*c*, remotely positioned lightweight headgear 82*c* similar in external configuration to the headgear unit 82 previously described. The headgear unit 82*c* may be conveniently supported in a manner similar to that illustrated with respect to the previous embodiments shown in FIGS. 8, 14 and 15. The headgear unit 82*c* is, however, different in construction from the headgear unit 82 in that the multiple conductor cable 81*c* includes sufficient leads for the separate actuation of two separate cathode ray tubes 94*c***, each of which is utilized to produce an image of the same scene in stereoptic fashion.

Aside from the differences in mounting and positioning the two cathode ray tubes 94 in lieu of a single tube, the remainder of the headgear unit **82*c* is substantially identical to that of the headgear unit 82, and includes a snout 92,** which houses the two cathode ray tubes in side by side relationship, a cup-like hemispherical shell 90c from which the snout projects, a pair of viewing windows 108c having eye cups 110c and a magnifying objective lens 112c at a viewing end.

FIGS. 11 and 12 illustrate a signal generating station for use in generating two separate stereoptic video signals to be used in conjunction with the alternate embodiment of the invention illustrated in FIG. 4. A pair of image tube cameras 44c, each of which includes an image tube and a suitable objective lens housed within a lens barrel 42c, are simultaneously operated such that the field of vision of each of the objective lenses (FIG. 4) will be registered at an appropriate viewing station, 28c, 30c of the stereoptic system 10c. Thus, with each of the cameras 44c operating in a conventional manner and with the field of vision of each of the objective lenses including the same scene, two video signals corresponding to two images of the scene as viewed by a person will be generated. It should be noted that each of the cameras 44c is spaced apart a distance such that the distance between the objective lens centers hence the centers of the viewing stations 28c, 30c, is approximately the average interpupillary distance.

In order to assure that the field of vision of each of the viewing stations 28c, 30c will include the same scene, a suitable image field conversion mechanism is utilized. From an observation of FIG. 11, it will be seen that the image field conversion adjusting mechanism is similar to the image field conversion adjusting linkage utilized in conjunction with the beam splitter 14 of the previous embodiment. The video cameras 44c are mounted to a tripod supported platform 134 and are supported between the platform 134 which serves as a base and a substantially parallel top platform 136 with the platforms maintained in spaced apart parallel relationship by four vertical corner posts 138.

It should be observed that each of the cameras 44c is pivotally supported along a vertical axis between the platforms 134, 136 by a pintle 58c journalled for rotation in appropriate sockets. The axis of each of the pintles extends through the approximate center of the length of each camera and adjacent the outwardly facing side wall thereof. Convergence of the image field of each of the cameras 44c is achieved through the adjustment mechanism having an upright strut 142 secured between the platforms 134, 136 and approximately between the cameras 44c at the rear thereof. A shaft 62c is journalled for rotation through an opening in the upright strut 142 which journal prevents sliding movement of the shaft with respect to the upright. A wheel 74c is positioned at one end of the shaft to facilitate manual rotation thereof, while the shaft is threaded adjacent the opposite end. The threaded portion of the shaft extends through a threaded opening 66c of a slotted yoke 68c. The yoke 68c includes a pair of camming slots 70c with each slot positioned adjacent one of the ends thereof and a follower rod 72c projects upwardly from each of the cameras 44c into the slot. The follower rods 72c extend upwardly from a zone of each camera adjacent the inner rear corner thereof. It will be appreciated that rotation of the shaft 62c through manual rotation of the wheel 74c will cause translatory movement of the yoke 68c, in a horizontal plane either toward or away from the front of the cameras. The engagement of the camming slots 70c with the follower rods 72c will cause coincident rotation of each of the cameras in a manner substantially identical to the linkage described in conjunction with the image displacer 14 of the previous embodiment. It will be appreciated that in operation translational movement of the yoke 68c will produce an arcuate sliding movement of each follower rod 72c in its associated camming slot 70c to rotate each camera 44c about its respective pintle 58c so that the field of vision of each of the viewing stations will be coincident, i.e., will include the same scene, irrespective of the distance between the scene and the cameras.

In FIG. 4, the use of a closed circuit distribution system 125c is illustrated, along with the simultaneous recording of each of the video modulated signals at a pair of video recording stations of a video recorder 128c is shown. The recorder 128c is designed to record each of the video modulated signals on the same tape. It should be understood that with either closed circuit distribution and/or reproduction of recorded images, the utilization of a headgear unit such as the unit 82c which employs two separate cathode ray tubes is desirable in this embodiment.

It will be realized with with either of the systems, i.e., a single generation of video signals for the reproduction of two images or dual generation of video signals for the separate CRT reproduction of two video images, a stereoptic visual reproduction system is provided which achieves the various objects of the invention and is well suited to meet the conditions of practical use.

As other possible embodiments might be made of the present invention, and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. An image system for the stereoptic reproduction of visual scenes, said system comprising means for the registration of two spaced apart images of the same scene, the registration means including an image displacer, the displacer comprising an upper wall and a lower wall, two viewing windows spaced apart an average interpupillary distance, means for conversion of the two images into video signals, the conversion means including an image camera, the image displacer further including a camera station for the presentation of the registered images in side by side relationship, a pair of first planar reflective surfaces, a pair of second planar reflective surfaces, each of the first reflective surfaces facing a viewing window, each of the second reflective surfaces facing the camera station, and means for the adjustment of the field of view of each of the viewing windows as perceived through the camera station for convergence at the same scene, the adjusting means including means pivotally mounting one of the pairs of reflective surfaces about vertical axes, a yoke extending between each of the pivotally mounted reflective surfaces, a camming slot adjacent each end of the yoke, a follower rod projecting from each pivotally mounted reflective surface, each follower rod extending into one of the camming slots, and means for imparting translational movement to the yoke along an axis extending between the viewing windows and the camera station to thereby simultaneously rotate the reflective surfaces about their respective axes, and the means for imparting translational movement to the yoke including a control shaft, means journaling the control shaft in the displacer, means preventing translational movement of the control shaft, means forming a mating threading engagement between the control shaft and the yoke, a ribbed wheel fixed to the control shaft, menas forming an opening in the upper wall in registry with the wheel, a portion of the wheel extending above the upper wall and through the opening for manual access, and means for preventing rotation of the yoke, the image system further including means for attachment of the image displacer to the image camera, and a remote receiving station for converting the video signals into images whereby stereoptic images of scenes spaced at various distances from the image camera may be reproduced for remote viewing.

2. An image system constructed in accordance with claim 1 wherein the means pivotally mounting the reflective surfaces extends between the walls.

3. An image system constructed in accordance with claim 1 wherein the means for attachment of the image displacer to the image camera includes means forming a collar on the displacer.

4. An image system constructed in accordance with claim 1 wherein the means for the attachment of the image displacer to the image camera includes a pair of guides secured to the camera, a pair of rails extending between the image displacer and the camera, each of the rails being engaged in one of the guides, whereby the image displacer is maintained in alignment regardless of camera adjustments.

5. An image system constructed in accordance with claim 4 wherein the attachment means further includes a second pair of guides secured to the displacer, each rail extending between a guide at the camera and a guide at the displacer.

* * * * *